United States Patent
Ragan et al.

(10) Patent No.: US 10,087,013 B2
(45) Date of Patent: Oct. 2, 2018

(54) ROLLER DRIVE

(71) Applicant: Laitram, L.L.C., Harahan, LA (US)

(72) Inventors: Bryant G. Ragan, Metairie, LA (US); John F. Landrum, New Orleans, LA (US); Robert L. Rosen, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/833,304

(22) Filed: Dec. 6, 2017

(65) Prior Publication Data

US 2018/0093833 A1  Apr. 5, 2018

Related U.S. Application Data

(63) Continuation of application No. PCT/US2016/034020, filed on May 25, 2016.

(60) Provisional application No. 62/173,581, filed on Jun. 10, 2015.

(51) Int. Cl.
| | |
|---|---|
| *B65G 13/06* | (2006.01) |
| *B65G 23/08* | (2006.01) |
| *H02K 1/14* | (2006.01) |
| *B65G 23/06* | (2006.01) |
| *H02K 7/14* | (2006.01) |
| *H02K 1/27* | (2006.01) |
| *H02K 19/10* | (2006.01) |
| *H02K 17/16* | (2006.01) |
| *H02K 1/24* | (2006.01) |

(52) U.S. Cl.
CPC ............. *B65G 23/08* (2013.01); *B65G 13/06* (2013.01); *B65G 23/06* (2013.01); *H02K 1/246* (2013.01); *H02K 1/2753* (2013.01); *H02K 7/14* (2013.01); *H02K 17/165* (2013.01); *H02K 19/106* (2013.01)

(58) Field of Classification Search
CPC ........ B65G 13/06; B65G 23/23; B65G 23/08; B65G 23/06; H02K 7/14; H02K 1/2753; H02K 1/246; H02K 19/106; H02K 17/165
USPC .................................................. 198/788, 789
See application file for complete search history.

(56) References Cited

U.S. PATENT DOCUMENTS

| | | | | |
|---|---|---|---|---|
| 3,782,530 A | * | 1/1974 | Breting | B65G 13/06 198/788 |
| 3,904,899 A | * | 9/1975 | Malfert | H02K 41/00 104/290 |
| 4,781,286 A | * | 11/1988 | Weaver | B65G 13/06 198/619 |
| 5,042,645 A | | 8/1991 | Pritchard | |
| 5,899,320 A | * | 5/1999 | Miyasaka | B65G 13/04 198/789 |
| 6,242,884 B1 | | 6/2001 | Lipo et al. | |
| 6,710,505 B1 | | 3/2004 | Barani et al. | |
| 6,879,082 B2 | * | 4/2005 | Erten | H02K 3/26 310/112 |
| 7,175,018 B2 | * | 2/2007 | Helgerson | B65G 13/06 198/780 |
| 8,365,903 B2 | | 2/2013 | Schmidt et al. | |

(Continued)

*Primary Examiner* — Mark A Deuble

(74) *Attorney, Agent, or Firm* — James T. Cronvich

(57) ABSTRACT

A drive system for a motorized roller that includes a secondary stator external to the motorized roller. The outer shell of the motorized roller contains electrically conductive or magnetic material to form an induction, permanent-magnet, or reluctance motor with the secondary stator and boosts or bucks the torque of the motorized roller.

20 Claims, 11 Drawing Sheets

(56) References Cited

U.S. PATENT DOCUMENTS

| | | |
|---|---|---|
| 8,471,425 B2 | 6/2013 | Petro et al. |
| 8,960,418 B2 * | 2/2015 | Rathmann .............. B65G 39/02 |
| | | 198/835 |
| 9,022,209 B2 * | 5/2015 | Ragan .................... B65G 23/04 |
| | | 198/788 |
| 9,108,807 B1 | 8/2015 | Ogle, II |
| 9,162,824 B2 * | 10/2015 | Ragan .................. H02K 7/1008 |
| 2004/0134752 A1 | 7/2004 | Miller et al. |
| 2004/0144622 A1 * | 7/2004 | Leingang ................ B64D 9/00 |
| | | 198/782 |
| 2012/0273328 A1 | 11/2012 | Sejourne |
| 2014/0110227 A1 | 4/2014 | Ragan et al. |
| 2016/0130089 A1 * | 5/2016 | Dimitrov ............... B65G 13/06 |
| | | 198/617 |
| 2016/0257495 A1 * | 9/2016 | Reed ................... B65G 13/073 |

* cited by examiner

ROLLER DRIVE

CROSS-REFERENCE TO RELATED APPLICATIONS

This application is a continuation of International Patent Application No. PCT/US2016/034020, filed May 25, 2016, which claims the benefit of U.S. Provisional Patent Application No. 62/173,581, filed Jun. 10, 2015. The disclosures of both those applications are incorporated by reference into this application.

BACKGROUND

The invention relates to power-driven conveyors and more particularly to motorized rollers.

Motorized rollers are commonly used to propel a series of conveyor rollers or conveyor belts. As shown in FIGS. 1a and 1b, motorized rollers 20 typically include an electric motor 22 whose output shaft 24 is coupled to a reduction gear 26 that drives an outer cylindrical shell 28. The motor 22 and the reduction gear 26 are housed inside the hollow cylindrical shell 28. Stationary end shafts 30 extend out from end caps 32 for mounting the motorized roller 20 to the side walls of a conveyor. At least one of the stationary shafts 30 can be hollow to admit power and control cables 34 to the motor 22. The outer cylindrical shell 28 rotates about an axis of rotation 36 coincident with the shafts 24, 30. The shell 28 can directly drive a tensioned conveyor belt; it can propel articles directly and drive other idle rollers to drive articles via one or more transmission belts; or it can have or be outfitted with lagging that has drive surfaces to positively drive a toothed belt.

Motorized rollers are generally small in diameter so that they can be closely spaced in a powered roller conveyor. But the small outside diameter of motorized rollers limits the size of the internal electric motor and the maximum torque available for a given roller speed.

SUMMARY

One version of a drive system embodying features of the invention comprises a motorized roller and an external stator. The motorized roller includes a primary motor and an outer cylindrical shell rotated in a direction of rotation by the primary motor about an axis of rotation. The outer cylindrical shell includes electrically conductive or magnetic material. The external stator is disposed proximate the outer cylindrical shell and external to the motorized roller. The stator produces a magnetic flux wave that travels circumferentially along a portion of the outer cylindrical shell and interacts with the electrically conductive or magnetic material to produce a torque rotating the outer cylindrical shell about the axis of rotation.

Another version of a drive system comprises a stationary roller having an outer cylindrical shell and an external magnetic-field source disposed proximate the outer cylindrical shell. The outer cylindrical is rotated in a direction of rotation about an axis of rotation by a primary drive. The outer cylindrical shell includes electrically conductive or magnetic material. The external magnetic-field source is external to the roller and produces a magnetic field that cuts the outer cylindrical shell and interacts with the electrically conductive or magnetic material to produce a torque rotating the outer cylindrical shell about the axis of rotation.

In another aspect of the invention a method for increasing or decreasing the torque of a motorized comprises: (a) mounting a curved stator external and proximate to a roller having an outer cylindrical shell and driven with a first torque by a primary drive; and (b) producing a magnetic field with the stator that travels along the outer cylindrical shell in a first direction to produce a second torque that boosts the first torque rotating the outer cylindrical shell or in an opposite second direction to produce a second torque that bucks the first torque rotating the outer cylindrical shell.

DETAILED DESCRIPTION

Figure 2:
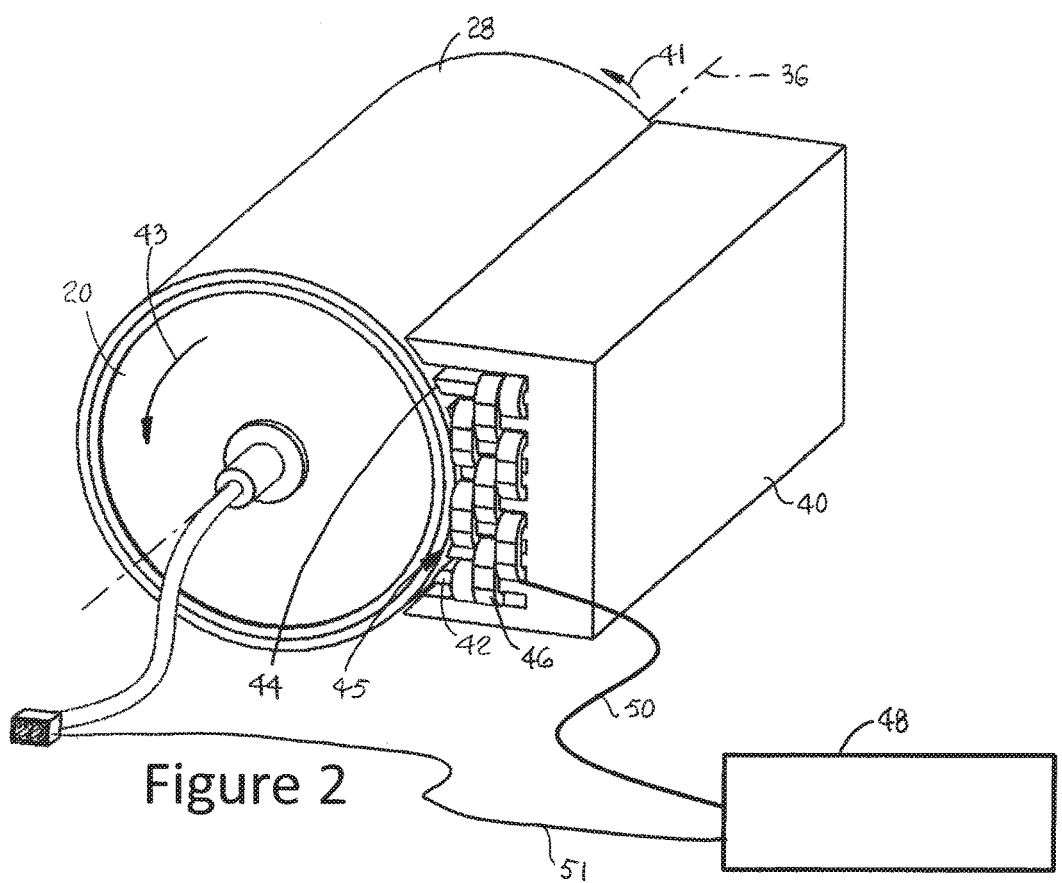
FIG. 2 is a hybrid isometric view and block diagram of a boost drive embodying features of the invention.

A boost drive system for a motorized roller embodying feature of the invention is shown in FIG. 2. A stator 40 is positioned close to the outer cylindrical shell 28 of a motorized roller 20 mounted stationary at a fixed position in a conveyor frame (not shown). The motorized roller's primary drive is its integral electric motor. The stator 40 has an array of poles 42 terminating in pole faces 44 proximate the shell 28. Each of the poles 42 is surrounded by windings 46, such as three-phase windings. The pole faces 44 define a curved plane whose shape is complementary to the outer shell 28 of the motorized roller 20 across an air gap 45. The stator 40 is an external magnetic-field source positioned close to the outer shell 28.

Figure 1A:
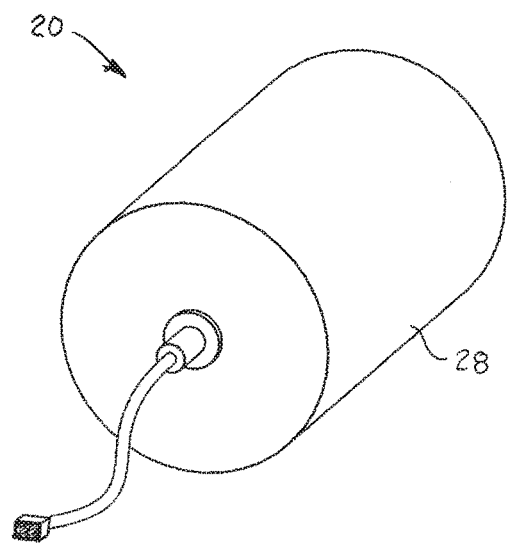
FIGS. 1a and 1b are isometric and cutaway side views of a prior-art motorized roller.
Figure 1B:
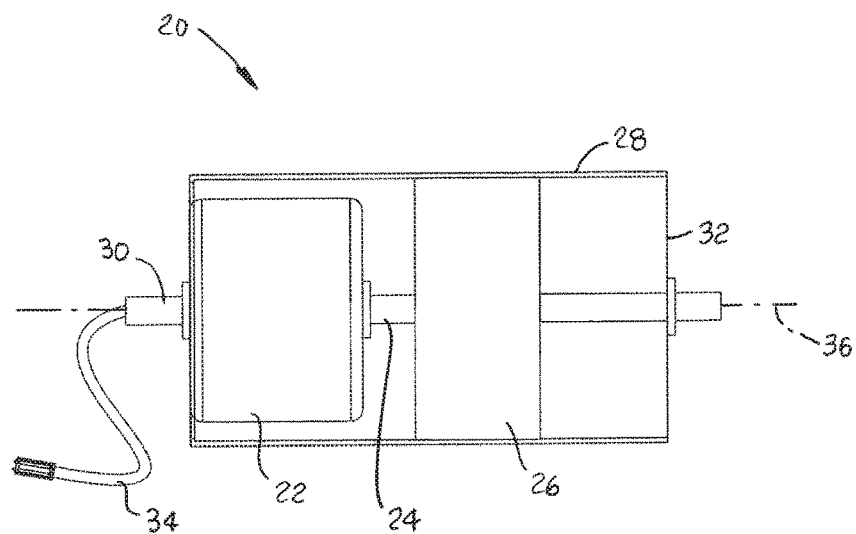

The stator 40 extends axially along the majority of the length of the motorized roller 20 and circumferentially along only a portion of the outer cylindrical shell 28. The stator 40 produces a magnetic flux wave that travels circumferentially through the air gap 45 and along the outer shell 28. The outer shell 28 includes electrically conductive material or magnetic material. The motorized roller's primary motor rotates the outer shell 28 in a direction of rotation 43. The magnetic flux wave produced by the stator 40 induces currents in the electrically conductive material or attracts the magnetic material, which produces a torque 41 in the shell 28 about the axis of rotation 36. The torque 41 due to the external stator 40 augments the torque produced by the motorized roller's internal primary motor (22, FIG. 1b) in a boost-drive system. A controller 48 powers and coordinates the operation of the stator 40 and the motorized roller 20 over power and control lines 50, 51.

Figure 3A:
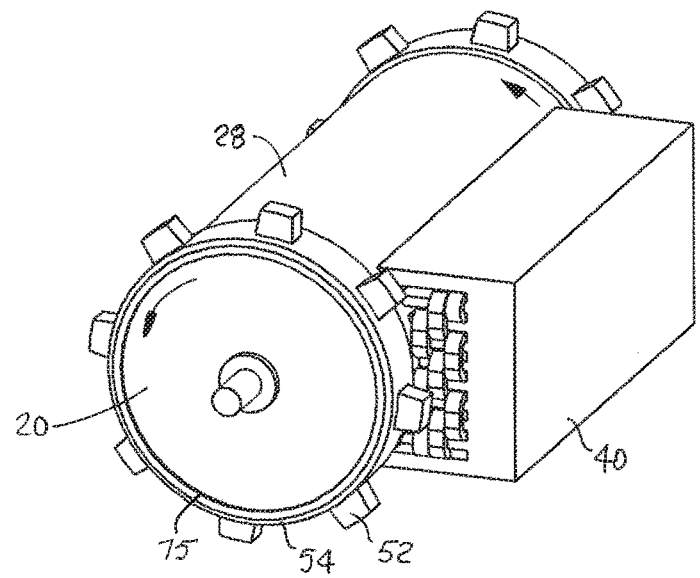
FIGS. 3a and 3b are isometric views of motorized rollers as in FIG. 2 with drive members extending from the periphery of the cylindrical shell at the edges of the shell in FIG. 3a and in an internal region of the shell in FIG. 3b.
Figure 3B:
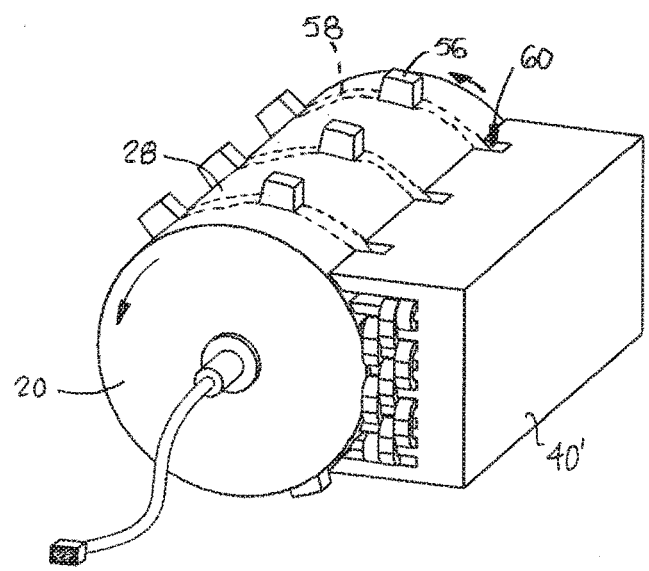

FIGS. 3a and 3b show motorized rollers 20 with drive elements extending radially outward from the outer cylindrical shell 28. In FIG. 3a the drive elements are teeth 52 formed on the peripheries of sprocket rings 54 mounted on the two opposite ends of the outer shell 28 so that they don't interfere with the positioning of the stator 40 close to the outer shell. In FIG. 3b the drive elements are teeth 56 that are arranged in circumferential lanes 58 on the outer cylindrical shell 28. The teeth 56 can be welded to the outer shell 28 or formed on lagging attached to the shell. Notches 60 formed in the stator 40' are axially aligned with the lanes 58 of drive elements 56 so that the stator can be positioned close to the outer shell 28 of the motorized roller 20 to boost the torque provided by the motorized roller's primary motor.

Figure 4A:
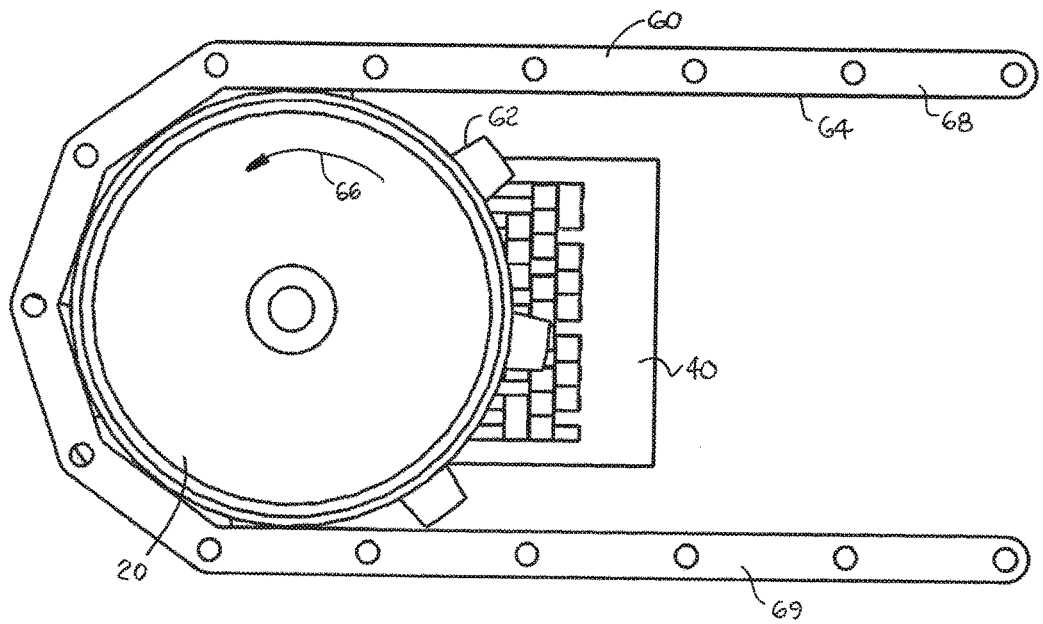
FIG. 4a is a side elevation view of a motorized roller with a boost drive as in FIG. 2 positively driving a conveyor belt.

The boost-drive system of FIGS. 3a and 3b is shown positively driving a conveyor belt 60 in FIG. 4a. Drive faces 62 on the drive elements 56 engage drive-receiving surfaces on the inner side 64 of the belt 60 to drive the belt in the direction of arrow 66. The stator 40 is shown conveniently mounted close to the motorized roller 20 between upper and low belt runs 68, 69.

Figure 4B:
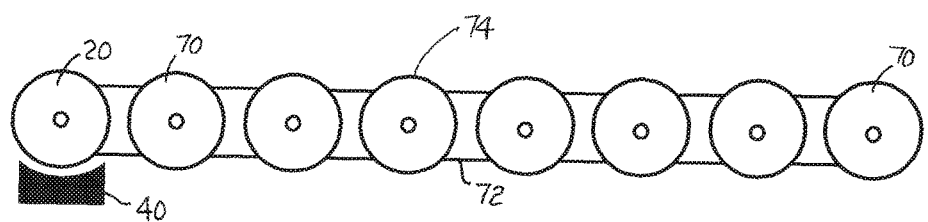
FIG. 4b is a side elevation view of a series of idle rollers driven by a motorized roller as in FIG. 2.

FIG. 4b shows the motorized roller 20 driving a series of idle rollers 70. A series of transmission belts 72 interconnect the outer shell 28 of the motorized roller 20 to the outer shells 74 of the idle rollers 70 and transmit the power from the motorized roller to the idle rollers. In this example the boost drive's stator 40 is mounted below the motorized roller 20 in the conveyor frame (not shown).

When the outer cylindrical shell is made of or includes electrically conductive material, such as aluminum or copper, the stator's magnetic flux wave induces currents in the shell. The induced currents produce reaction magnetic fields that interact with the stator flux wave to produce a torque on the shell. Thus, the outer shell acts as the rotor in an induction motor formed with the stator. As shown in FIG. 3a, an inner cylinder 75 backs the outer cylindrical shell 28. The inner cylinder 75 is made of a magnetically soft material, such as carbon steel, to complete the magnetic circuit with the stator 40.

Figure 5:
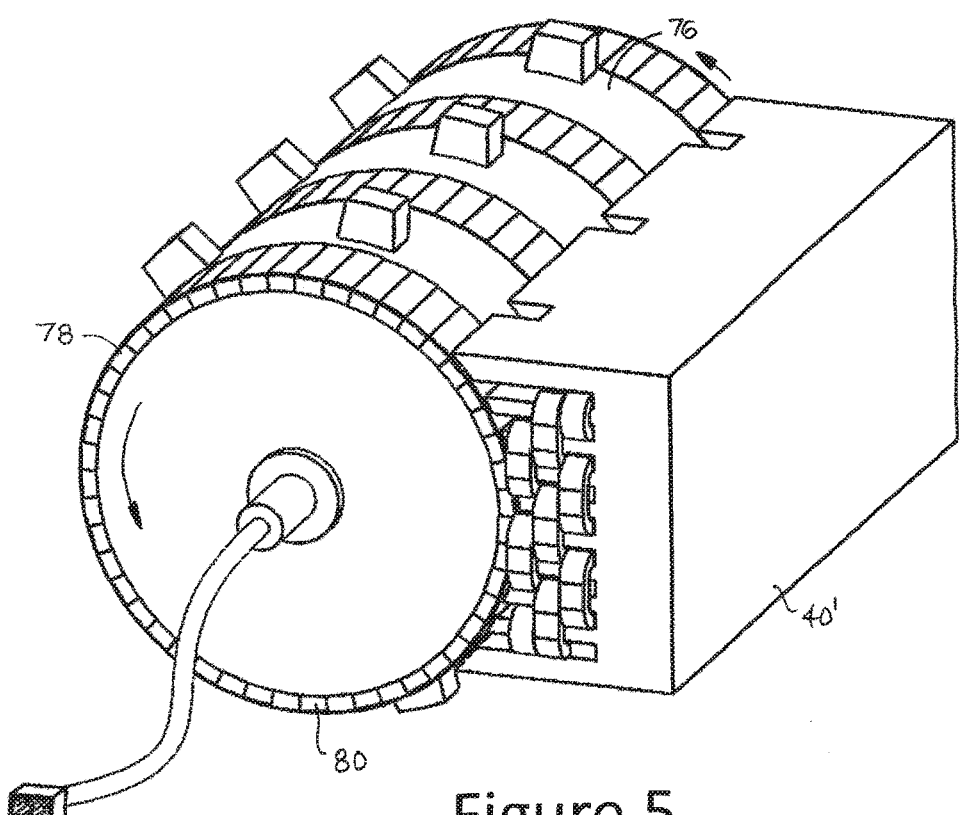
FIG. 5 is an isometric view of a boost drive as in FIG. 3b, but with an array of permanent magnets.
Figure 6:
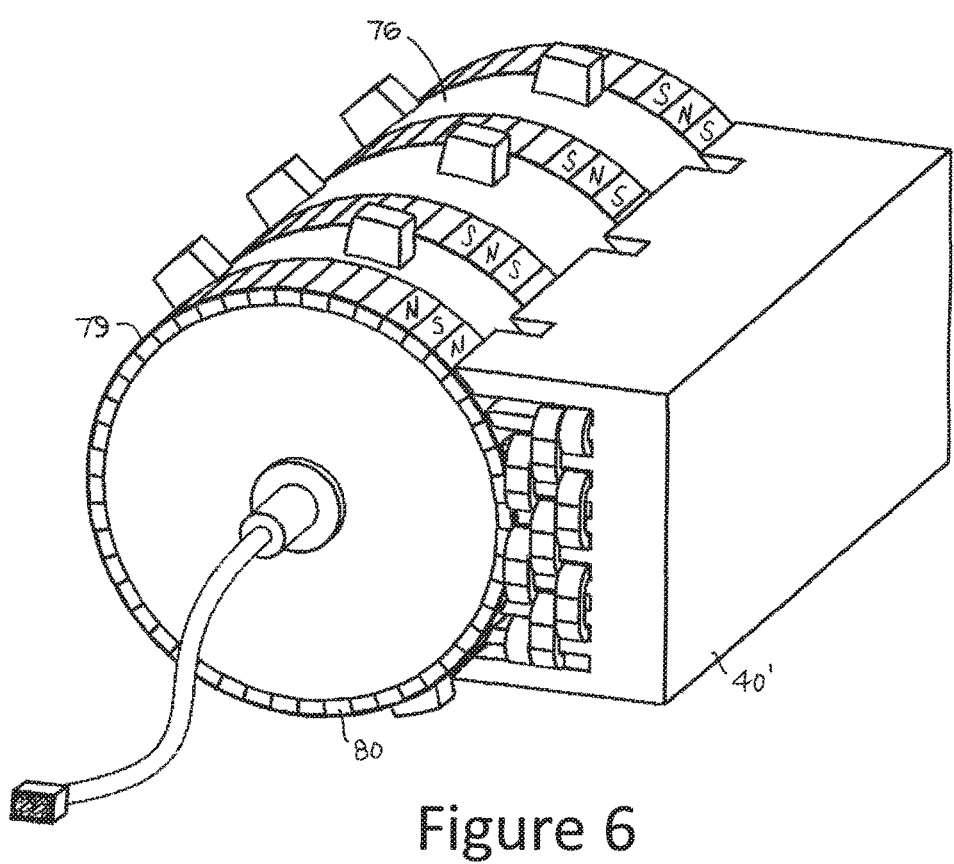
FIG. 6 is an isometric view of a boost drive as in FIG. 5, but with staggered permanent-magnet bands.
Figure 7:
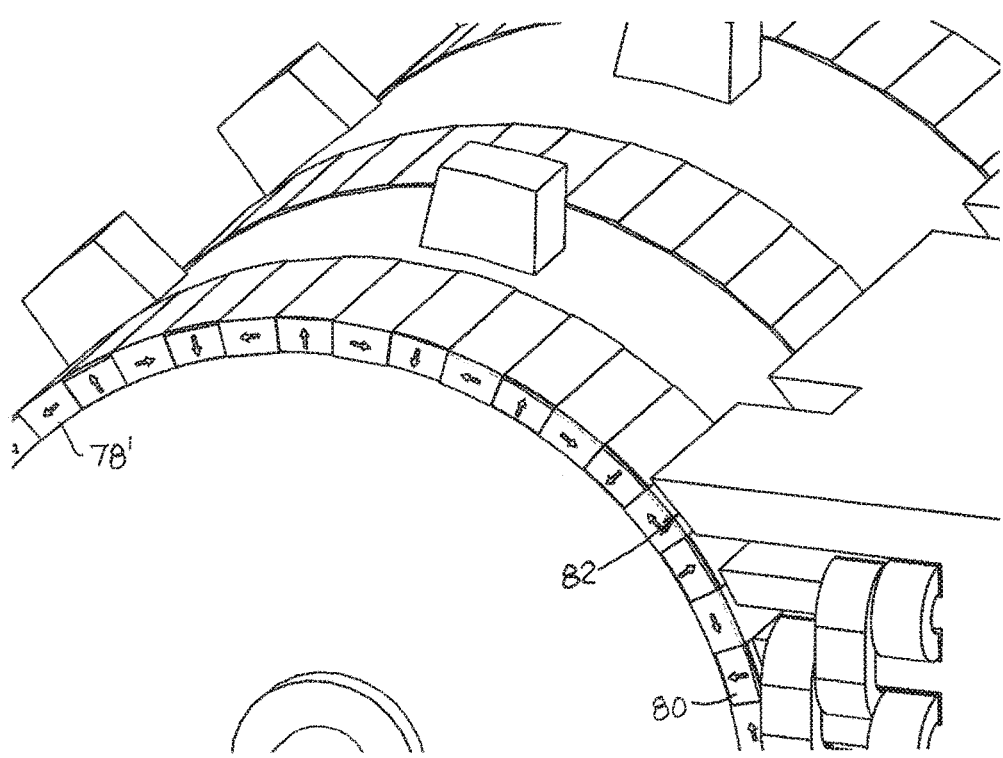
FIG. 7 is an enlarged view of FIG. 6 showing the array of permanent magnets arranged in a Hallbach array.

FIG. 5 shows an outer cylindrical shell 76 that includes magnetic material in the form of circumferential bands 78 of permanent magnets 80. The bands are spaced apart axially on the shell 76. The magnetic flux wave produced by the stator 40' interacts with the magnetic field of the permanent magnets to create a synchronous permanent-magnet or stepper motor. Permanent magnets of common polarity are axially aligned across all four bands 78. In FIG. 6 the bands 79 of permanent magnets 80 are shown with circumferentially alternating north (N) and south (S) poles around the outer cylindrical shell 76. The bands 79 are circumferentially offset from one another so that poles of the same polarity are not axially aligned from band to band. With the poles staggered in this manner, cogging of the outer shell 76 at low belt speeds is reduced. For example, if the magnet bands 79 are advanced 90° magnetically from band to band in the axial direction, the cogging action is broken into four components, each occurring 90° out of phase from its neighboring bands with a frequency of four times the cogging frequency of the unstaggered bands 78 of FIG. 5 and one-fourth the cogging amplitude. In this arrangement corresponding magnet poles from band to band lie on a helical curve on the outer cylindrical shell 76. The bands 78' of permanent magnets are arranged in a Hallbach array in FIG. 7 to focus the magnetic field of the magnets outward into the gap 82 between the stator poles and the magnets 80 for better magnetic coupling and higher torque.

Figure 8:
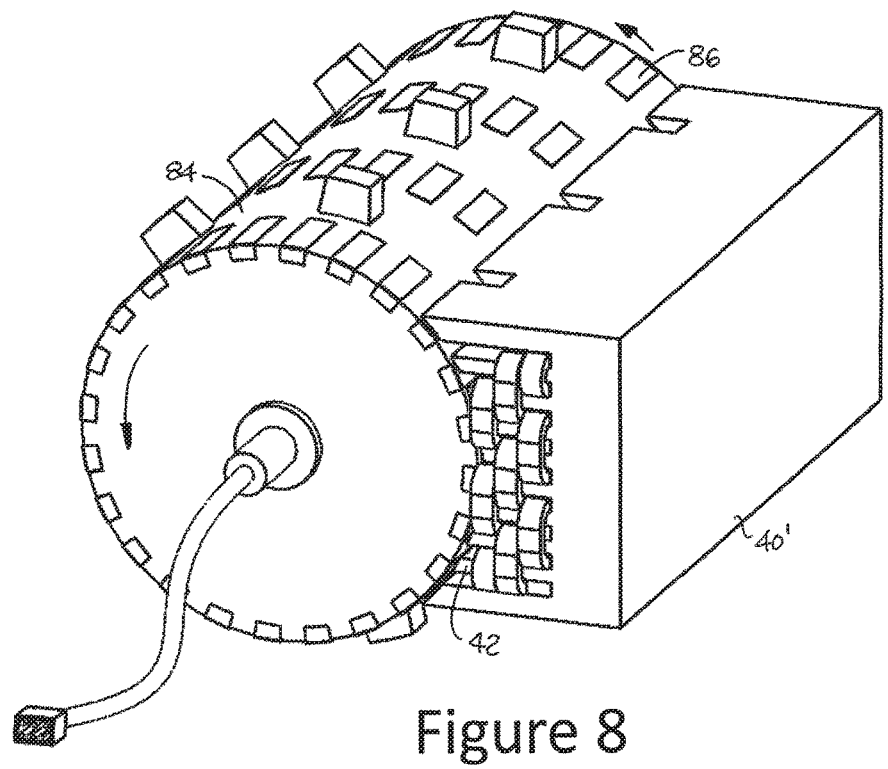
FIG. 8 is an isometric view of a boost drive for a toothed motorized roller with an array of magnetically soft poles in the motorized-roller outer shell.
Figure 9:
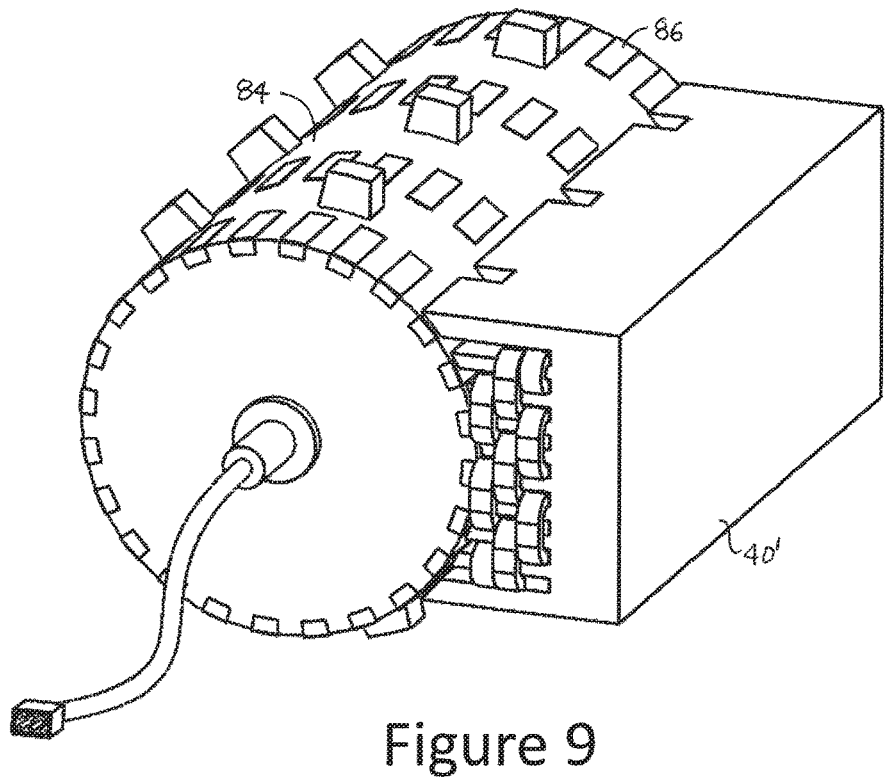
FIG. 9 is an isometric view of the boost drive of FIG. 8 with offset poles.

FIGS. 8 and 9 show a motorized roller with an outer cylindrical shell containing an array of pole pieces 86 made of a magnetically soft material. The poles 86 are circumferentially and axially spaced apart along and across the outer shell 84. The shell 84 with its soft magnetic poles 86 forms a reluctance motor with the stator 40'. The soft magnetic poles 86, seeking to minimize the reluctance of the magnetic circuit they form with the stator poles 42, are pulled along by the stator's magnetic flux wave, which produces a torque on the shell. To minimize cogging effects at low speeds, the rotor poles 86, like the permanent-magnet bands 79 of FIG. 6, are staggered (offset circumferentially) in FIG. 9 so that no two poles of the same polarity are aligned axially.

Figure 10A:
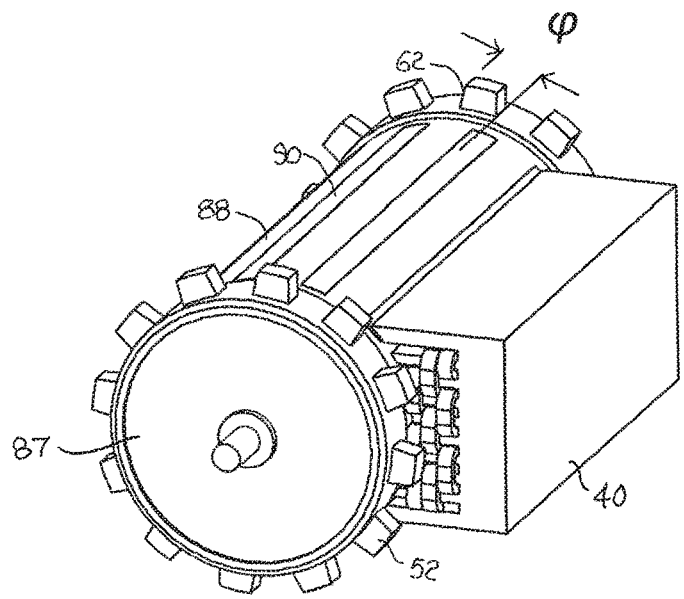
FIG. 10a is an isometric view of a boost drive as in FIG. 3a, but with poles that extend across the width of the outer shell.
Figure 10B:
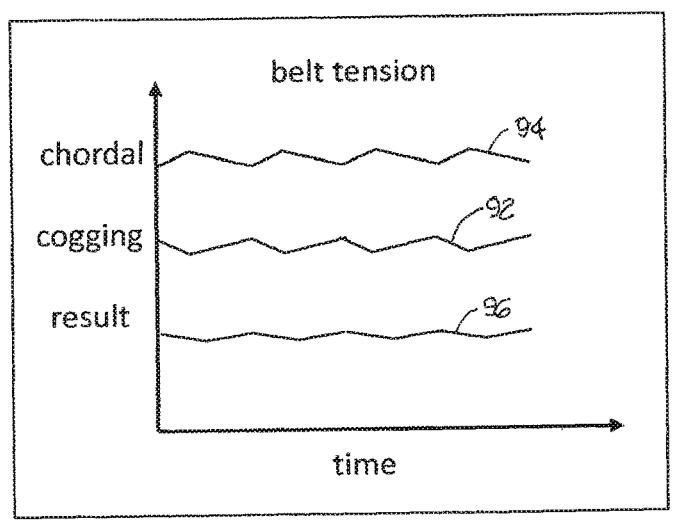
FIG. 10b is a stylized graph of belt tension due to chordal action and belt tension due to cogging.

In FIG. 10a a motorized roller 87 is shown with an outer cylindrical shell 88 having elongated permanent magnets 90 extending axially along the shell. (Bands of permanent magnets, as in FIG. 5, would behave similarly.) The permanent-magnet motor so formed with the stator 40 causes a regular variation in belt tension and speed that is due to cogging. The period of the cogging is related to the circumferential spacing (the pole pitch) of the permanent magnets 90. That relationship 92 is shown in FIG. 10b. When the motorized roller 87 is used to drive an articulating conveyor belt, such as the belt 60 in FIG. 4a, the belt is subject to chordal action, which causes a variation in belt tension and speed. The period of that variation is related to the pitch (the circumferential spacing of the teeth 52 on the sprockets). The effect of chordal action on the belt tension 94 is shown in FIG. 10b. If the tooth pitch is the same as the pole pitch, the periods of the variations in belt tension and speed due to cogging 92 and to chordal action will be the same. By adjusting the phase q of the poles 90 relative to the drive faces 62 of the teeth 52, the cogging variation can be made 180° out of phase with the chordal action variation. The result 96 is full or partial cancellation of chordal action by cogging and smoother belt motion as shown in FIG. 10b.

Figure 11:
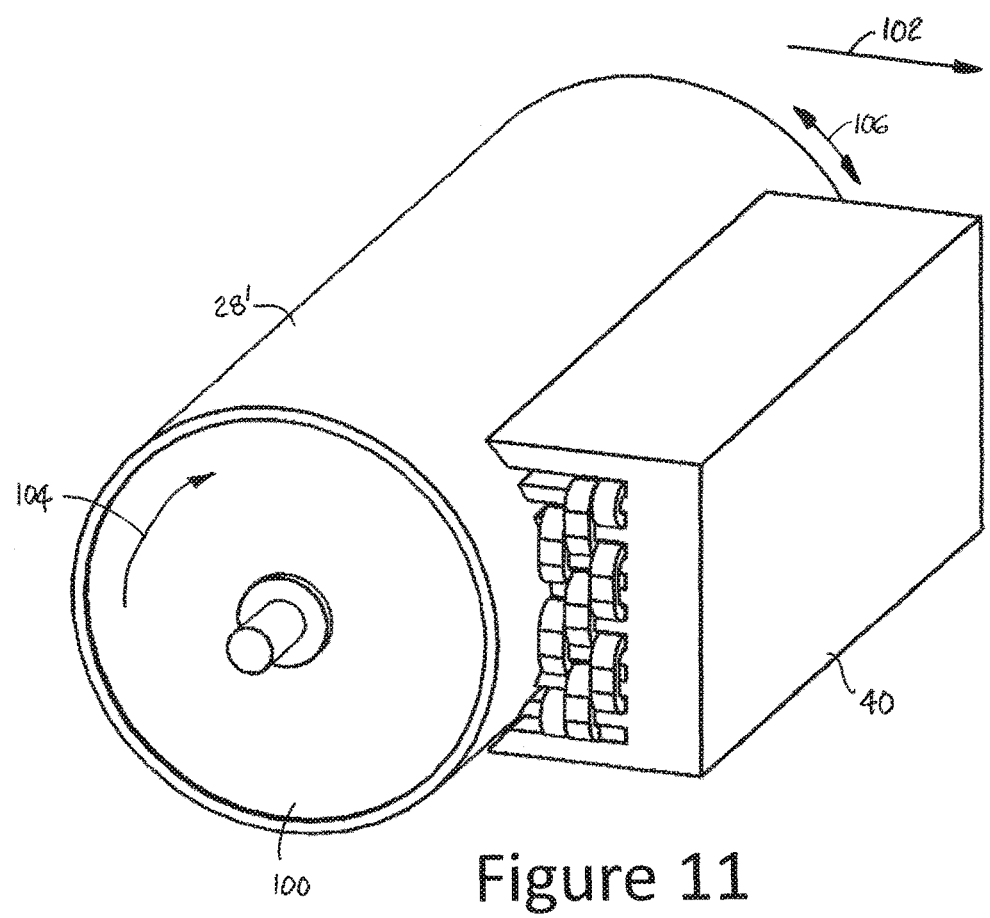
FIG. 11 is an isometric view of an external stator as in FIG. 2 acting on an idle roller to damp speed variations.

FIG. 11 shows a stator 40 acting on the outer cylindrical shell 28' of an idle roller or pulley 100, such as for a conveyor belt (not shown) advancing in a direction of belt travel 102 along an upper carryway. The idle roller 100 is engaged directly or indirectly via sprockets or other intervening drive elements with the driven conveyor belt serving as the idle roller's primary drive. The curved stator is positioned close to the shell 28' between the carryway and the belt's lower returnway as in FIG. 4a. In this example the shell 28' is made of an electrically conductive material to function as the rotor of an induction motor having the stator 40. A controller, such as the controller 48 in FIG. 2, coordinates the belt's primary drive motor with the operation of the idle roller's stator 40. The magnetic field of the stator 40 is pulsed to induce currents in the conductive outer shell 28' that oppose or aid the rotation 104 of the idle roller with torque pulses 106 opposite to or in the same direction as the primary rotation 104. In this way the external stator 40 is used to damp speed variations in the belt with the external stator 40 causing a torque that bucks the idle roller's rotation. As for the boost drives, magnetic material, such as soft-iron pieces or permanent magnets, could be embedded in the outer shell 28' to achieve damping using reluctance-motor or synchronous-motor techniques.

Figure 12A:
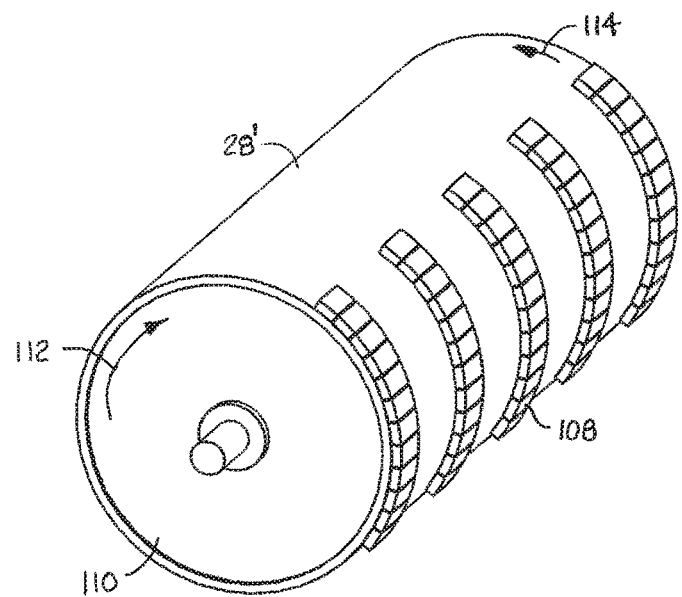
FIG. 12a is an isometric view of external bands of permanent magnets for producing drag on an idle roller.

An alternative way to damp speed variations is with curved bands of permanent magnets 108 mounted external to the electrically conductive outer cylindrical shell 28' of an idle roller 110 across an air gap as in FIG. 12*a*. (To simplify the drawing, mounting structure is not shown.) Like the stator 40 in FIG. 11, the curved array of permanent magnets 108 forms an external magnetic-field source positioned close to the cylindrical shell 28' to affect its rotation. In this case the permanent magnets 108 form a permanent-magnet stator producing a static magnetic field. As the idle roller rotates in a direction of rotation 112, the static magnetic field produced by the permanent magnets 108 induces eddy currents in the conductive outer shell 28'. The eddy currents produce reaction fields that interact with the permanent-magnet field to create a drag force 114 on the shell 28' opposing the primary rotation 112 due to the idle roller's engagement with a driven conveyor belt (not shown).

Figure 12B:
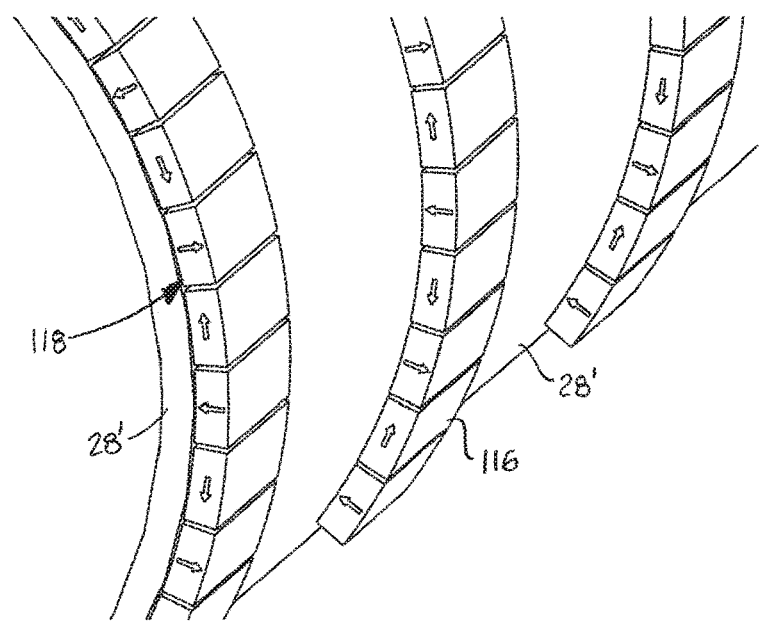
FIG. 12b is an enlarged view of the permanent magnets of FIG. 12b arranged in a Hallbach array.

The drag force 114 damps speed pulsations in the belt and idle roller. As shown in FIG. 12*b*, the permanent-magnet bands can be arranged in Hallbach arrays 116 to increase the magnetic-field strength crossing the air gap 118 between the Hallbach arrays 116 and cutting the conductive cylindrical shell 28'.

The term motorized roller is meant to encompass drum drives, motorized pulleys, and any motorized conveyor drive that has an axially elongated cylindrical outer drive shell, whether or not the motor is housed within the shell.

What is claimed is:

1. A drive system comprising:
a motorized roller including:
a primary motor;
an outer cylindrical shell rotated in a direction of rotation by the primary motor about an axis of rotation;
wherein the outer cylindrical shell includes electrically conductive or magnetic material;
an external stator disposed proximate the outer cylindrical shell and external to the motorized roller and producing a magnetic flux wave that travels circumferentially along a portion of the outer cylindrical shell and interacts with the electrically conductive or magnetic material to produce a torque rotating the outer cylindrical shell about the axis of rotation.

2. A drive system as in claim 1 wherein the external stator has a plurality of poles with pole faces defining a curved plane complementary to the shape of the outer cylindrical shell.

3. A drive system as in claim 1 wherein the outer cylindrical shell is made of an electrically conductive material and wherein the motorized roller further includes an inner cylinder made of a magnetically soft material backing the outer cylindrical shell to form an induction motor with the outer cylindrical shell and the external stator.

4. A drive system as in claim 1 wherein the outer cylindrical shell includes an array of poles made of magnetically soft material circumferentially arranged around the outer cylindrical shell to form a reluctance motor with the external stator.

5. A drive system as in claim 4 wherein the array of poles includes axially spaced apart circumferential bands of the poles and wherein the bands are circumferentially offset from one another so that no two poles are axially aligned.

6. A drive system as in claim 1 wherein the outer cylindrical shell includes a plurality of permanent magnets circumferentially arranged around the outer cylindrical shell to form a permanent-magnet motor with the external stator.

7. A drive system as in claim 6 wherein the permanent magnets have poles that alternate in polarity circumferentially around the outer cylindrical shell.

8. A drive system as in claim 6 wherein the permanent magnets are arranged in a Hallbach array.

9. A drive system as in claim 6 wherein the permanent magnets are arranged in multiple axially spaced apart circumferential bands of permanent magnets.

10. A drive system as in claim 1 wherein the motorized roller further includes one or more circumferential lanes of drive elements extending radially outward of the outer cylindrical shell and wherein the external stator includes notches forming passageways axially aligned with the lanes to accommodate the drive elements advancing through the external stator.

11. A drive system as in claim 1 wherein the motorized roller further includes one or more circumferential lanes of drive elements extending radially outward of the outer cylindrical shell and forming drive faces and wherein the outer cylindrical shell includes an array of poles circumferentially arranged around the outer cylindrical shell and wherein the poles are staggered circumferentially with respect to the drive faces.

12. A drive system as in claim 1 further comprising a controller driving the external stator in coordination with the driving of the motor in the motorized roller.

13. A drive system comprising:
a stationary roller having an outer cylindrical shell rotated by a primary drive in a direction of rotation about an axis of rotation, wherein the outer cylindrical shell includes electrically conductive or magnetic material;
an external magnetic-field source disposed proximate the outer cylindrical shell and external to the roller and producing a magnetic field that cuts the outer cylindrical shell and interacts with the electrically conductive or magnetic material to produce a torque rotating the outer cylindrical shell about the axis of rotation.

14. A drive system as in claim 13 wherein the external magnetic-field source is an external stator whose magnetic field is a magnetic flux wave that travels circumferentially along a portion of the outer cylindrical shell.

15. A drive system as in claim 13 wherein the outer cylindrical shell contains electrically conductive material and wherein the external magnetic-field source is an array of permanent magnets producing a static magnetic field that induces eddy currents in the electrically conductive material in the outer cylindrical shell that produce a drag force opposed to the direction of rotation.

16. A drive system as in claim 13 wherein the roller is an idle roller and the primary drive is a driven conveyor belt drivingly engaged with the idle roller.

17. A drive system as in claim 13 wherein the roller is a motorized roller having a primary motor driving the roller in the direction of rotation, the primary motor being the motorized roller's primary drive.

18. A method for increasing or decreasing the torque of a roller, the method comprising:
mounting a curved stator external and proximate to a roller having an outer cylindrical shell and driven with a first torque by a primary drive;
producing a magnetic field with the stator that travels along the outer cylindrical shell in a first direction to produce a second torque that boosts the first torque rotating the outer cylindrical shell or in an opposite second direction to produce a second torque that bucks the first torque rotating the outer cylindrical shell.

19. The method of claim 18 wherein the stator comprises a curved array of stator poles producing the magnetic field as a traveling magnetic field.

20. The method of claim 18 wherein the stator comprises a curved array of permanent magnets producing the magnetic field as a static magnetic field that travels along the outer cylindrical shell in the second direction as the roller rotates through the magnetic field to produce a second torque that bucks the first torque rotating the outer cylindrical shell.

* * * * *